May 25, 1943.   B. R. BENJAMIN ET AL   2,320,168
TRACTOR
Filed Sept. 23, 1940   2 Sheets-Sheet 1
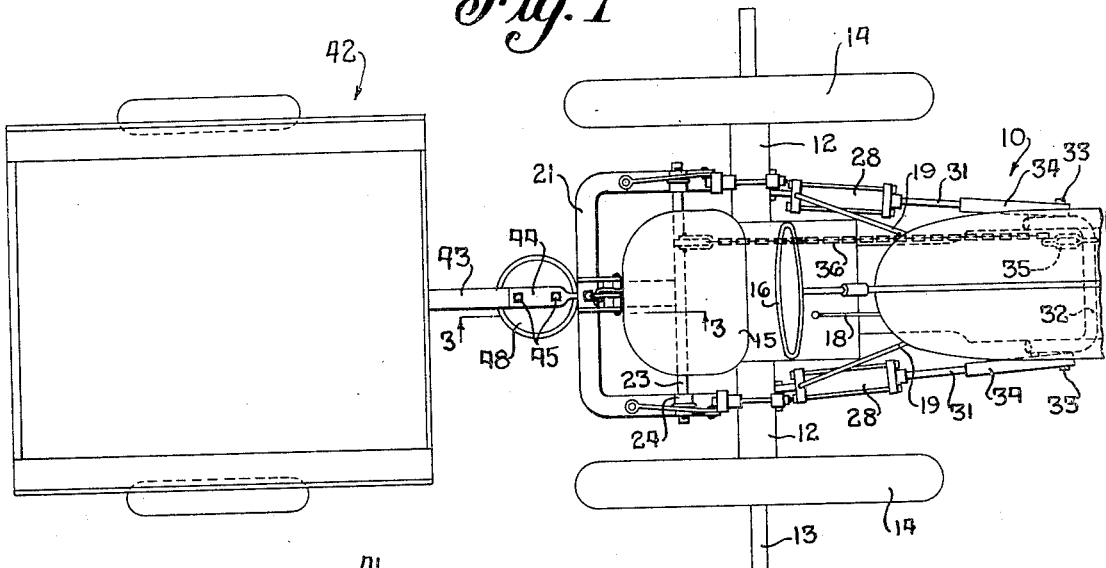
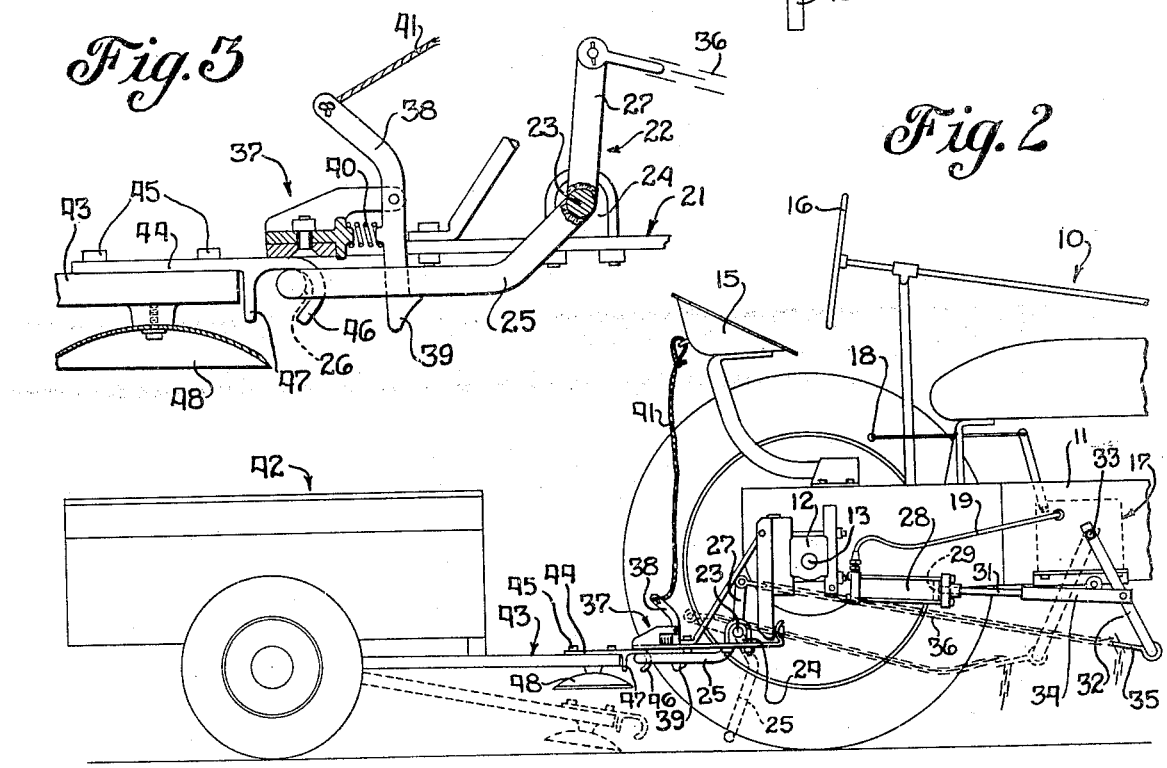
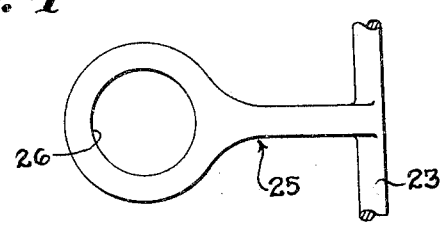
Inventor
Bert R. Benjamin
Harry J. Mott
By Paul O. Pippel
Att'y.

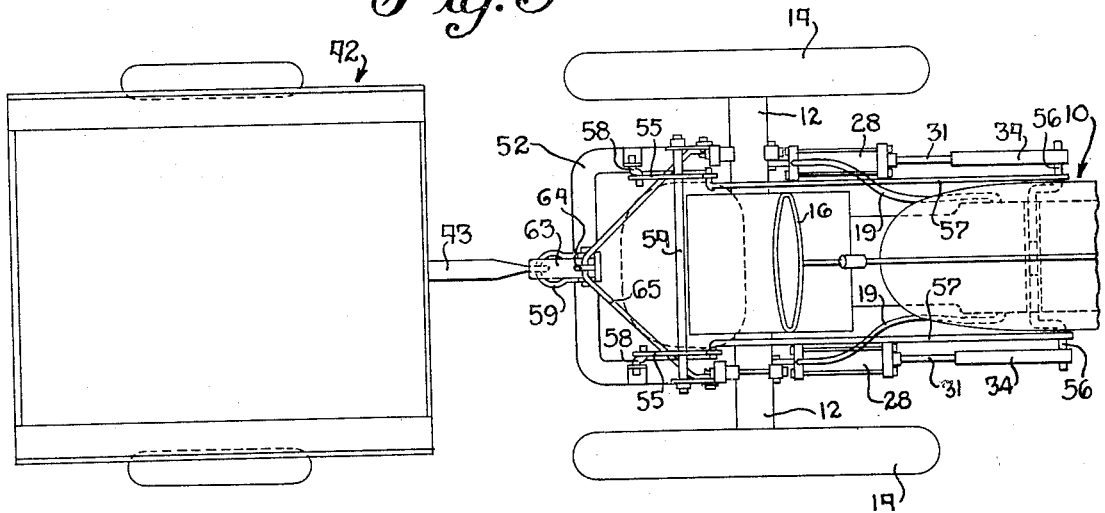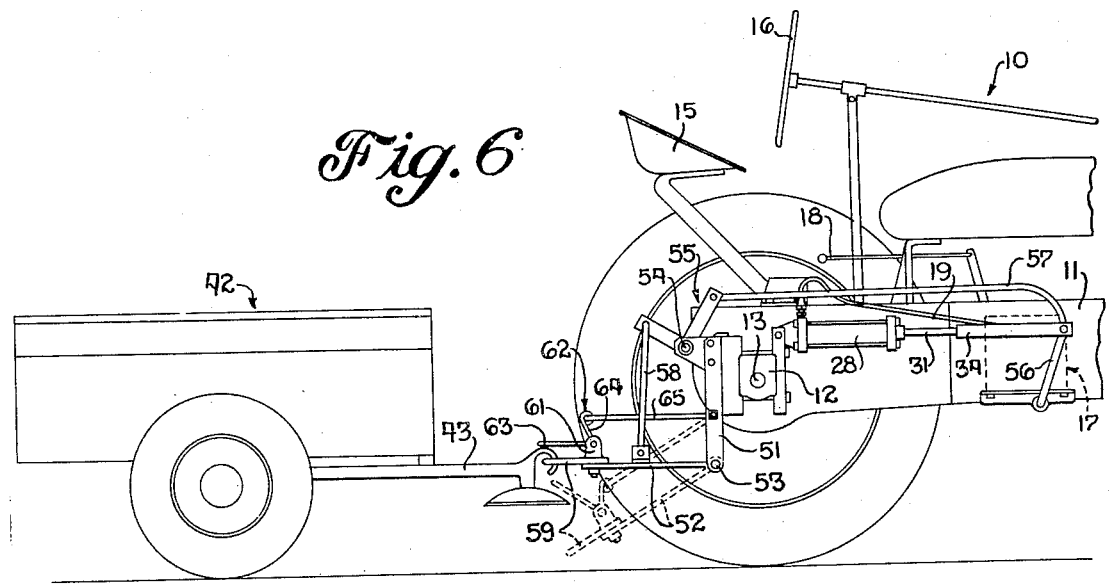

Patented May 25, 1943

2,320,168

UNITED STATES PATENT OFFICE 2,320,168

TRACTOR

Bert R. Benjamin, Oak Park, and Harry J. Mott, Maywood, Ill., assignors to International Harvester Company, a corporation of New Jersey Application September 23, 1940, Serial No. 357,906

1 Claim. (Cl. 280—33.44)

This invention relates to improvements in tractors, and more particularly it has to do with the provision of an improved hitching device therefor.

Modern type tractors are used for many purposes and it is desirable to have a hitching device on the tractor that can be automatically connected to implements, so that the operator need not dismount from the tractor. This automatic type of hitch is especially useful with trailers or manure spreaders which are mounted on two wheels and have a support provided for the draft tongue thereof. Many times, when the trailer or manure spreader is loaded, the support for the tongue will sink into the ground, making it practically impossible to connect the tongue to the tractor by hand.

It is, therefore, an object of the present invention to provide a hitch device which can be automatically connected to an implement.

Another object of the invention is to provide a hitch device which will lift the implement and which will securely hold the implement in engagement with the hitch after the hitch has been lifted.

Another object of the invention is to provide an automatic hitch device for a tractor which is simple and inexpensive to manufacture.

According to the present invention the tractor is provided with a power-actuated-draft member which is adapted to move vertically toward and away from the ground. The draft member in its lower position is engageable with an implement. Upon upward movement of the draft device the implement is lifted into a raised position. A part extending from the tractor contacts the draft device of the implement when the draft member is in a raised position and holds the draft device of the implement in engagement with said draft member.

These and other objects and advantages of the present invention will be made apparent in a consideration of the following detailed description of the preferred embodiment of our invention, reference being had to the drawings appended thereto, in which:

Figure 1 is a plan view of a tractor with the automatic hitch device mounted thereon;

Figure 2 is a side view of the tractor with one of the wheels removed, and with the hitch device mounted on the tractor;

Figure 3 is an enlarged sectional view of the hitch device taken along the line 3—3 of Figure 1;

Figure 4 is a detail plan view of the draft member;

Figure 5 is a plan view of a tractor with a modification of the hitch device mounted thereon; and, Figure 6 is a side view of a tractor with one of the wheels removed and with the modification of the hitch device mounted thereon.

Referring now to the drawings, the tractor 10 is of the conventional type and consists of a body portion 11, at the rear of which extend rear axle housings 12, from which extend axles 13. Wheels 14 are adjustably secured on the axles 13. An operator's seat 15 is provided at the rear of the tractor adjacent a steering wheel 16.

The tractor body 11 is provided with an auxiliary power plant in the form of a hydraulic pump 17 which is adapted to be driven by the motor of the tractor. The hydraulic pump 17 is controlled or operated through a lever 18. Since the hydraulic pump is old and any suitable power plant may be used, it is believed sufficient to say that upon operation of the pump 17 fluid is pumped into the conduits 19 extending from the pump at each side of the tractor body 11.

A conventional type draw-bar 21 is secured to the rear axle housing 12. On the draw-bar 21 is pivotally mounted a draft device 22 which consists of a transverse shaft 23 journaled in suitable bracket members 24 secured to the draw-bar 21. A draft member 25, having an enlarged end portion in which there is an opening 26, is welded or otherwise secured to the transverse shaft 23. As shown in Figure 3, the enlarged opening is positioned approximately below the draw-bar 21.

The transverse shaft 23 has secured thereto a vertical arm 27 which is provided to adjust the transverse shaft 23 and to move the draft member toward and away from the draw-bar 21. Any suitable means may be employed to actuate or move the shaft 23, but in the present case, this shaft is operated from the hydraulic pump 17. A cylinder 28 is provided at each side of the tractor and connected to the rear axle housing 12. A piston 29 works within the cylinder 28 and a piston rod 31 connected thereto extends from the cylinder 28. A bail member 32 is pivotally mounted on the tractor by means of bolts 33. A sleeve 34 is provided at each side of the tractor and secured to the bail member 32. The piston rod 31 is slidably mounted within the sleeve 34. The bail 32 is provided with a clevis 35 and a chain 36 connects the clevis 35 and the arm 27 on the rock-shaft 23. The conduit 19 is connected to the cylinder 28.

Upon moving the lever 18 the hydraulic pump 17 pumps fluid through the conduit 19 into the cylinder 28 wherein the piston 29 is moved to effect adjustment of the bail member 32. Since the bail member 32 is connected to the rock-shaft 23 by the chain 36, the draft member 25 is moved from the position shown in dotted lines in Figure 2 into a juxtaposition with the draw-bar 21.

Referring to Figure 3, it will be seen that the draw-bar 21 is provided with a device 37 which consists of a pivotally mounted latch member 38 having a hook portion 39. A spring 40 operates between the device 37 and the latch member 38. A rope 41, connected to the latch member 38, is connected to the tractor operator's seat 15 so that the operator may have ready access thereto. The hook portion 39 is adapted to engage in the opening 36 in the draft member 25 and securely hold the draft member in its raised position. A wheeled trailer 42 having a draft tongue 43 to which a hitch part 44 is secured is connected to the hitch device. The hitch part 44 is bolted to the draft tongue 43 by bolts 45, and the end of the hitch part is provided with a downwardly extending hook portion 46 and a stop portion 47. A disk 48 is secured in any suitable manner to the lower side of the draft tongue 43 to hold the draft tongue off of the ground, as is shown in dotted lines in Figure 2.

When it is desired to connect the draft member to the trailer, the draft member 25 is moved into the dotted line position shown in Figure 2. The tractor 10 is then backed up so that the opening 26 is beneath the hook portion 46 of the hitch part. The lever 18 is then operated so as to actuate the hydraulic pump 17 whereby fluid pressure is supplied to the cylinder 28 to raise the draft member 25. When the draft member is raised, the hitch part 44 is securely held between the draft member 25 and the draw-bar 21. When the draft member is in its raised position, the latch member 38 automatically locks the draft member to the draw-bar.

Referring now to Figures 5 and 6, a modification of the automatic hitch is shown. In this form a supporting structure 51 is secured to the rear axle housing 12 and a draw-bar 52 is pivotally connected thereto by means of bolts 53. A rock-shaft 54 is journaled in suitable bearings provided on the supporting structure 51. A pair of bell cranks 55 are journaled to the rock-shaft 54. The cylinder 28 is connected to the tractor and the piston rod 31 of the piston within the cylinder is slidably mounted within the sleeve 34 which in this case is pivotally connected to links 56, pivotally mounted at each side of the tractor. Rods 57 connect the arms 56 and one arm of the bell crank 55. The other arm of the bell crank 55 is connected to the draw-bar 52 by means of links 58. A part 59 having an enlarged opening similar to the enlarged opening in the draft member 25 is secured to the draw-bar 52. The part 59 is provided with a portion 61 on which is pivotally mounted a member 62. A portion 63 of the member 62 is adapted to extend over the opening in the part 59. An arm 64 extending from the member 62 is connected to the supporting structure 51 by a link 65. In this form of the invention, upon operation of the lever 18, the hydraulic pump 17 pumps fluid into the conduits 19, thence into the cylinder 28, to move the links 56 about their pivotal connections to the tractor and through the link 57, the bell crank 55 and the rock-shaft 54 are rotated. The link 58 connected to the draw-bar 52 effects vertical adjustment of the draw-bar. Referring to Figure 6, it will be noted that when the draw-bar 52 is in the position shown in dotted lines, the portion 63 of the part 62 is moved away from the opening in the part 59. The tractor may then be backed up so that an implement may be hooked into the opening of the part 54. Upon upward movement of the draw-bar 52 the portion 63 is moved through the link 65 toward the opening of the part 59 so as to securely hold the implement connected to the part. If desired, a suitable latching device may be provided between the draw-bar 52 and the supporting structure 51 whereby the draw-bar may be locked in any of its adjusted positions.

From the foregoing description it is obvious that an improved hitching device has been provided for a tractor. The tractor may be moved into a position so that the draft member mounted thereon may engage an implement to lift the implement into a position so that it may be transported, and the implement is securely held in engagement with the draft member when it is lifted. The draft member in its raised position may be locked with respect to the draw-bar.

It is to be understood that while we have shown and described two preferred forms of our invention, the latter is not to be limited to the particular details shown and described, but that widely different means may be employed in the practice of the broader aspects of the invention.

What is claimed is:

In combination, a tractor having a power plant and a pivotally mounted draw-bar which is adapted to move vertically, a rock-shaft journaled on the tractor, means connecting the power plant and the rock-shaft in such a manner that upon operation of the power plant the rock-shaft is rotated, means connecting the rock-shaft and the draw-bar, a hitch part having an opening, said hitch part secured to the draw-bar, and a member movably associated with the hitch part and extending over the opening in said hitch part and mounted on the tractor in such a manner that upon downward movement of the draw-bar the member will move away from said opening so that said opening may engage an implement and on upward movement of the draw-bar the member will move toward the opening and hold the implement in engagement with said hitch part.

BERT R. BENJAMIN.
HARRY J. MOTT.